United States Patent
Nakamura

(10) Patent No.: US 11,554,735 B2
(45) Date of Patent: Jan. 17, 2023

(54) CONTROL DEVICE, AND METHOD FOR CONTROLLING PROTECTIVE DEVICE

(71) Applicant: Arriver Software AB, Linköping (SE)

(72) Inventor: Yoriko Nakamura, Yokohama (JP)

(73) Assignee: Arriver Software AB, Linköping (SE)

( * ) Notice: Subject to any disclaimer, the term of this patent is extended or adjusted under 35 U.S.C. 154(b) by 585 days.

(21) Appl. No.: 16/604,460

(22) PCT Filed: Feb. 9, 2018

(86) PCT No.: PCT/JP2018/004592
§ 371 (c)(1),
(2) Date: Oct. 10, 2019

(87) PCT Pub. No.: WO2018/189993
PCT Pub. Date: Oct. 18, 2018

(65) Prior Publication Data
US 2020/0148148 A1    May 14, 2020

(30) Foreign Application Priority Data

Apr. 11, 2017    (JP) .............................. JP2017-078424

(51) Int. Cl.
*B60R 21/0132*    (2006.01)
*B60R 21/231*    (2011.01)
(Continued)

(52) U.S. Cl.
CPC .... *B60R 21/01336* (2014.12); *B60R 21/0133* (2014.12); *B60R 21/232* (2013.01);
(Continued)

(58) Field of Classification Search
CPC .............. B60R 21/0133; B60R 21/232; B60R 2021/0004; B60R 2021/0009;
(Continued)

(56) References Cited

U.S. PATENT DOCUMENTS 5,964,817 A  *  10/1999  Dalum .............. B60R 21/01336
                                                        340/436
6,038,495 A      3/2000  Schiffmann
(Continued)

FOREIGN PATENT DOCUMENTS

DE      19848997 A1    4/1999
EP       1616758 A1    1/2006
(Continued)

OTHER PUBLICATIONS

Tsoi et al.; Validation of Event Data Recorders in High Severity Full-Frontal Crash Tests; SAE International Journal of Transportation Safety , vol. 1, No. 1 (Jun. 2013), pp. 76-99 (Year: 2013).*
(Continued)

*Primary Examiner* — Michael J Zanelli
(74) *Attorney, Agent, or Firm* — Arriver Software AB

(57) ABSTRACT

Techniques for controlling a protection apparatus are provided. An example method includes detecting an offset collision or diagonal collision, and activating a suitable protection apparatus for protecting the side or head of a passenger at a timing in accordance with the degree of collision. An example controller may include a level calculation part for calculating a level of a front face collision, a $\Delta V_{offset}$ calculation part for making an offset adjustment of a speed ($\Delta V$), and a determination part for determining an offset collision or diagonal collision based on the level of the front face collision and the $\Delta V_{offset}$.

7 Claims, 15 Drawing Sheets

(51) Int. Cl.
*B60R 21/232* (2011.01)
*B60W 30/08* (2012.01)
*B60R 21/00* (2006.01)
*B60R 21/01* (2006.01)

(52) U.S. Cl.
CPC ....... *B60R 21/23138* (2013.01); *B60W 30/08* (2013.01); *B60R 2021/0004* (2013.01); *B60R 2021/0009* (2013.01); *B60R 2021/0023* (2013.01); *B60R 2021/0048* (2013.01); *B60R 2021/01034* (2013.01); *B60R 2021/01327* (2013.01)

(58) Field of Classification Search
CPC .... B60R 2021/0023; B60R 2021/0048; B60R 2021/01034; B60R 21/01336; B60R 21/23138; B60R 2021/01327; B60W 30/08
See application file for complete search history.

(56) References Cited

U.S. PATENT DOCUMENTS

| | | | | |
|---|---|---|---|---|
| 6,167,335 | A | 12/2000 | Ide et al. | |
| 6,198,387 | B1 * | 3/2001 | Dalum | B60R 21/0132 340/436 |
| 6,756,889 | B2 * | 6/2004 | Sala | B60R 21/0132 340/436 |
| 8,073,596 | B2 | 12/2011 | Le et al. | |
| 2004/0051632 | A1 | 3/2004 | Sala et al. | |
| 2010/0256872 | A1 | 10/2010 | Le et al. | |
| 2015/0105982 | A1 | 4/2015 | Okamura | |

FOREIGN PATENT DOCUMENTS

| | | |
|---|---|---|
| JP | H10185943 A | 7/1998 |
| JP | H10300770 A | 11/1998 |
| JP | H11194137 A | 7/1999 |
| JP | 2004009804 A | 1/2004 |
| JP | 2011235833 A | 11/2011 |
| JP | 2013103629 A | 5/2013 |
| JP | 2013173387 A | 9/2013 |
| WO | 2014089026 A1 | 6/2014 |

OTHER PUBLICATIONS

Extended European Search Report received for the European Patent Application No. 18784417.0, dated Dec. 23, 2020, 8 pages.
International Search Report (in English and Japanese) and Written Opinion (in Japanese) issued in PCT/JP2018/004592, dated Apr. 17, 2018; ISA/JP.
Shelby, Steven G., "Delta-V as a Measure Of Traffic Conflict Severity", 3rd International Conference on Road Safety and Simulation, Sep. 14-16, 2011, 20 Pages, Retrieved from tsshelby@econolite.com.

* cited by examiner

FIG. 9

|  | | $\Delta V_{y\ offset}$ | | |
|---|---|---|---|---|
|  | | 0 | 1 | 2 |
| L/R Overlap | 0 | 0 | 0 | 0 |
| | 1 | 0 | 1 | 2 |
| | 2 | 0 | 2 | 2 |

FIG. 10

S27 DETERMINATION RESULTS

|  | | 0 | 1 | 2 |
|---|---|---|---|---|
| X/Y Ratio | 0 | 0 | 0 | 0 |
| | 1 | 0 | 1 | 2 |
| | 2 | 0 | 1 | 2 |

CONTROL DEVICE, AND METHOD FOR CONTROLLING PROTECTIVE DEVICE

CROSS-REFERENCE TO RELATED APPLICATIONS

This application is a 371 U.S. National Phase of International Application No. PCT/JP2018/004592, filed on Feb. 9, 2018, which claims priority to Japanese Application No. 2017-078424, filed on Apr. 11, 2017. The entire disclosures of the above applications are incorporated herein by reference.

FIELD OF THE INVENTION

The present invention relates to a control apparatus for controlling the activation of a protection apparatus which protects a passenger of a vehicle when an offset collision or diagonal collision occurs, along with a method for controlling a protection apparatus.

BACKGROUND ART

A protection apparatus such as an airbag and a seat belt pretensioner for protecting a passenger from impact during a collision is provided in a vehicle. When a vehicle collides, for example, a determination is made regarding whether or not the control apparatus will activate the protection apparatus based on a detection signal input from an acceleration sensor in a control apparatus disposed at the center of the vehicle. While the acceleration sensor as a main sensor is embedded in the control apparatus, the acceleration sensor as a satellite sensor is often provided, for example, in the crush zone of the front of the vehicle for instantaneously detecting a collision of the vehicle and suitably protecting a passenger.

For example, Patent Document 1 discloses the invention of a side collision determination apparatus, which includes a satellite sensor on both sides of a vehicle, and determines whether or not the deployment of a curtain airbag (hereinafter, referred to as a CAB) provided on a ceiling part of the vehicle is necessary based on the X acceleration in the anteroposterior direction of the vehicle detected by the satellite sensor, along with the Y acceleration in the width direction, if a side collision (side face collision) occurs.

Among front face collisions, a front face collision in which almost no rotational component is included in the vehicle during the collision is referred to as a full-lap (full overlap) front face collision (head-on collision), such as a front face collision in which a vehicle collides in a state in which the shaft center parallel to the collision direction of another vehicle or obstacle does not deviate from the central line (shaft center) parallel to the anteroposterior direction of the vehicle, or nearly the entire width of the front face of the vehicle collides with the other vehicle or obstacle for example. In this case, a passenger is protected by a front airbag (hereinafter, referred to as an FAB) as a protection apparatus inflated from the front.

Other examples of a front face collision include: an offset (small overlap) collision in which a portion of the front face of the vehicle (the front right of the vehicle or the front left of the vehicle) collides; and a diagonal collision (oblique collision) in which the vehicle collides from the front at a diagonal angle. In the case of an offset collision or diagonal collision, a side airbag (hereinafter, referred to as an SAB) provided on the side of the vehicle protects the side of the passenger or a CAB protects the head of the passenger. That is, the SAB and the CAB may be used for cases other than the abovementioned side face collision.

Offset collisions and diagonal collisions are also kinds of front face collision, wherein, for example, in a control apparatus of a passenger protection apparatus in Patent Document 2, the direction of the offset collision or the diagonal collision can be configured by the ratio of $\Delta V$ obtained based on the Y acceleration to $\Delta V$ obtained based on the X acceleration detected by the acceleration sensor.

Unfortunately, because each $\Delta V$ is obtained by integrating both the X acceleration and the Y acceleration to determine the direction, the determination method is complicated and an offset collision or diagonal collision cannot be distinguished from a head-on collision depending on the collision speed. Therefore, a suitable protection apparatus for protecting the passenger may not be selected.

Moreover, while the direction of an offset collision or diagonal collision is configured to be determined by the difference of $\Delta V$ obtained by integrating the X acceleration detected by both the left and right satellite sensors, if the satellite sensors break down, an offset collision or diagonal collision problematically cannot be distinguished from a head-on collision.

PRIOR ART DOCUMENTS

Patent Documents

Patent Document 1: Japanese Unexamined Patent Application Publication No. 2011-235833
Patent Document 2: U.S. Pat. No. 8,073,596

SUMMARY OF THE INVENTION

Problems to be Solved by the Invention

The present invention has been created in view of such problems, with an object of providing a control apparatus of a protection apparatus, which, with a simple configuration and excluding side face collisions as well as head-on collisions, can favorably detect an offset collision or diagonal collision, then activate a suitable protection apparatus for protecting the side or head of a passenger at a timing in accordance with the degree of collision, in addition to providing a method for controlling a protection apparatus.

Means for Solving the Problems

A control apparatus of a passenger protection apparatus according to the present invention includes: a first acceleration detection part disposed at the front of a vehicle to detect a first acceleration in the longitudinal direction of the vehicle; a second acceleration detection part disposed at the center of the vehicle to detect a second acceleration in the longitudinal direction of the vehicle and a third acceleration in the width direction of the vehicle; and a control part for determining a front face collision based on the accelerations detected by the first acceleration detection part and the second acceleration detection part to activate the passenger protection apparatus; wherein the control part includes:

a speed calculation part for integrating the accelerations (detected by the first acceleration detection part and the second acceleration detection part) to obtain a speed ($\Delta V$); a level calculation part for calculating a level of a front face collision based on the first acceleration and the second acceleration; a $\Delta V_{offset}$ calculation part for making an offset adjustment of $\Delta V$ obtained by integrating the third acceleration so as to attenuate ΔV of the third acceleration based on a head-on collision, in order to obtain $\Delta V_{offset}$; and a first determination part for determining a presence of an offset collision or diagonal collision based on the level of the front face collision along with the $\Delta V_{offset}$; and wherein the control part activates the passenger protection apparatus for protecting the side or head of a passenger including a side airbag and a curtain airbag, if it is determined using the first determination part that an offset collision or diagonal collision has occurred.

With such a configuration, once the front face collision level is obtained by a second acceleration, etc., and it is confirmed that the level is at the activation determination level or higher of the passenger protection apparatus of a front face collision, etc., an offset collision or diagonal collision is determined. Therefore, with a side face collision excluded, an offset collision or diagonal collision can be favorably detected.

If a high speed head-on collision occurs, the rotation due to impact after the collision may increase ΔV of the third acceleration. In contrast, in the present invention, in order to prevent ΔV of the third acceleration based on the head-on collision from increasing, the third acceleration is subjected to an offset process (bias) to attenuate ΔV, making it possible to favorably detect an offset collision or diagonal collision. That is, because the presence of an offset collision or diagonal collision is determined based on $\Delta V_{offset}$, a head-on collision which does not require the deployment of the side airbag and the curtain airbag can be excluded.

In addition, based on the level of a front face collision and $\Delta V_{offset}$, a suitable protection apparatus for protecting the side or head of a passenger can be activated at a timing in accordance with the degree of collision.

In the control apparatus according to the present invention, the control part compares the $\Delta V_{offset}$ with a threshold to determine the presence and direction of an offset collision or diagonal collision.

With such a configuration, an accurate determination can be made regarding whether or not to activate a side and head protection apparatus on either side in the width direction of the vehicle.

In addition, the side and head protection apparatus can be activated at a more favorable timing in accordance with the degree of collision.

In the control apparatus according to the present invention, the control part includes: a first determination technique for determining the presence and direction of an offset collision or diagonal collision based on a ratio of the third acceleration to the second acceleration; and a second determination part for determining the presence of an offset collision or diagonal collision, using at least one second determination technique for determining the presence and direction of an offset collision or diagonal collision, based on the difference of ΔV based on the first acceleration detected by each first acceleration detection part, upon configuring the first acceleration detection part on both sides in the width direction at the front of the vehicle.

With such a configuration, because the determination based on $\Delta V_{offset}$ is combined with the determination based on the acceleration detected by multiple acceleration detection parts, the presence of an offset collision or diagonal collision can be more precisely determined and the collision direction can be more precisely detected.

In the first determination technique, if the second acceleration increases in the case of a head-on collision, the ratio of the third acceleration decreases, while in the case of an offset collision or diagonal collision, the ratio of the third acceleration increases compared with the ratio during a head-on collision, so as to determine the collision form. If the ratio of the third acceleration is a positive value or negative value, a determination is made regarding whether or not it has exceeded either a positive threshold or a negative threshold, making it possible to detect the collision direction.

In the second determination technique, because a collision object collides head on in the width direction at the front of the vehicle, the difference of ΔV of the first acceleration detection part on both sides thereof is small. In contrast, in the case of an offset collision or diagonal collision, when the difference therebetween increases, the collision form is determined, wherein, if the difference of ΔV is either a positive value or a negative value, the collision direction can be detected.

In the control apparatus according to the present invention, the control part includes either: a threshold setting part for counting an elapsed time from a time point (at which it is determined that the second acceleration is at the start threshold or greater of a control algorithm) to set the threshold for determining the presence of an offset collision or diagonal collision using the first determination part or the second determination part in accordance with the elapsed time; or a valid period setting part for setting a valid period of the threshold in accordance with the elapsed time.

If a head-on collision occurs, the rotation due to impact after the collision may increase ΔV. In contrast, in the present invention, the threshold is set in accordance with the elapsed time or the valid period of the threshold is set, making it possible to distinguish the abovementioned case from an offset collision or diagonal collision.

In the control apparatus according to the present invention, the control part includes a processing part for subjecting at least one of the first acceleration, the second acceleration, and the third acceleration to a low pass filter process.

With such a configuration, unnecessary high frequency noise is removed, while high frequency acceleration input occurring during low speed head-on collisions and running on bad roads is removed, making it possible to improve the precision of the direction determination of an offset collision or diagonal collision.

In the control apparatus according to the present invention, based on the first acceleration, the second acceleration, the third acceleration, and ΔV obtained by integrating these accelerations, the level calculation part obtains a logical product of these to obtain the level of a front face collision.

With such a configuration, the level of a front face collision can be precisely obtained.

In the control apparatus according to the present invention, the second acceleration detection part is provided at the center of the vehicle.

If the acceleration detection part is provided at the center of the vehicle, the behavior of the vehicle can be favorably determined, with a low rate of failure occurrence.

A method for controlling a protection apparatus according to the present invention includes:

determining a level of a front face collision based on a first acceleration in the longitudinal direction of a vehicle detected by a first acceleration detection part disposed at the front of the vehicle, along with a second acceleration in the longitudinal direction detected by a second acceleration detection part disposed at the center of the vehicle;

making an offset adjustment of ΔV obtained by integrating a third acceleration in the width direction of the vehicle detected by the second acceleration detection part so as to attenuate ΔV of the third acceleration based on a head-on collision, in order to obtain a ΔV$_{offset}$ point;

determining a presence of an offset collision or diagonal collision based on the level of the front face collision and the ΔV$_{offset}$; and activating the passenger protection apparatus for protecting the side and head of a passenger including a side airbag and a curtain airbag, if it is determined that an offset collision or diagonal collision has occurred.

With such a configuration, it is confirmed that the collision is a front face collision using the second acceleration, etc., after which the presence of an offset collision or diagonal collision is determined based on ΔV$_{offset}$. Therefore, with a side face collision excluded, an offset collision or diagonal collision can be favorably detected.

If a high speed head-on collision occurs, the rotation due to impact after the collision may increase ΔV of the third acceleration. In contrast, in the present invention, in order to prevent ΔV of the third acceleration based on the head-on collision from increasing, the third acceleration is subjected to an offset process (bias) to attenuate ΔV, making it possible to exclude head-on collisions which do not require deployment of the side airbag or curtain airbag.

In addition, based on the level of a front face collision and ΔV$_{offset}$, a suitable protection apparatus for protecting the side or head of a passenger can be activated at a timing in accordance with the degree of collision.

Effects of the Invention

The present invention can, with a simple configuration and excluding side face collisions as well as head-on collisions, favorably detect an offset collision or diagonal collision, and then activate a suitable protection apparatus for protecting the side or head of a passenger at a timing in accordance with the degree of collision.

BRIEF DESCRIPTION OF THE DRAWINGS

FIG. 9 is a view illustrating a matrix for the determination of S27.

FIG. 10 is a view illustrating a matrix for the determination of S28.

MODE FOR CARRYING OUT THE INVENTION

Figure 1:
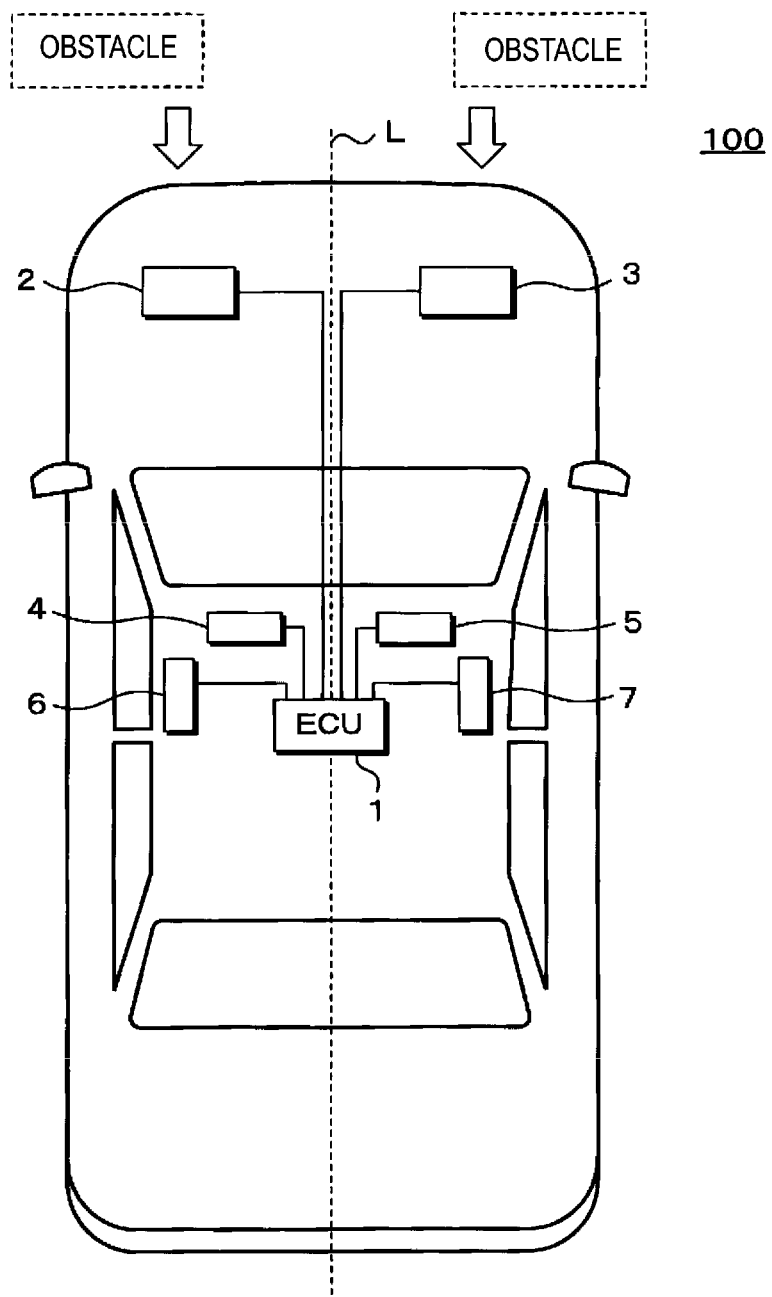
FIG. 1 is a schematic view illustrating a vehicle including a control apparatus according to an embodiment.

FIG. 1 is a schematic view illustrating a vehicle 100 including a control apparatus according to an embodiment. Hereinafter, the "left" and "right" of the vehicle 100 mean the "left" and "right" of the center line L at the center in the width direction of the vehicle.

The vehicle 100 includes: an ECU 1; a left satellite sensor 2; a right satellite sensor 3; a front protection apparatus 4 at the front left; a front protection apparatus 5 at the front right; a side and head protection apparatus 6 at the center left; and a side and head protection apparatus 7 at the center right. Although an illustration thereof has been omitted, the side and head protection apparatuses 6, 7 are provided in a rear seat.

The front protection apparatuses 4, 5 are FABs, etc. which are deployed during a front face collision to protect a passenger in the driver seat and passenger seat. The side and head protection apparatuses 6, 7 are CABs, SABs, seat belt pretensioners, etc. which are deployed during an offset collision, a diagonal collision, and a side face collision to protect the passenger in the driver seat and passenger seat. The ECU 1 is provided at substantially the center of the vehicle 100, while the front protection apparatuses 4, 5, along with the side and head protection apparatuses 6, 7, are connected to the ECU 1, with the activation thereof controlled by the ECU 1.

The satellite sensors 2, 3 are acceleration sensors and are mounted on, for example, a bumper. The satellite sensors 2, 3 detect the X acceleration in the anteroposterior direction of the vehicle, along with the Y acceleration in the width direction thereof, and then generate an electric signal and output the electric signal to the ECU 1. Note that the satellite sensors 2, 3 may output the acceleration to the ECU 1 via wireless communication.

Figure 2:
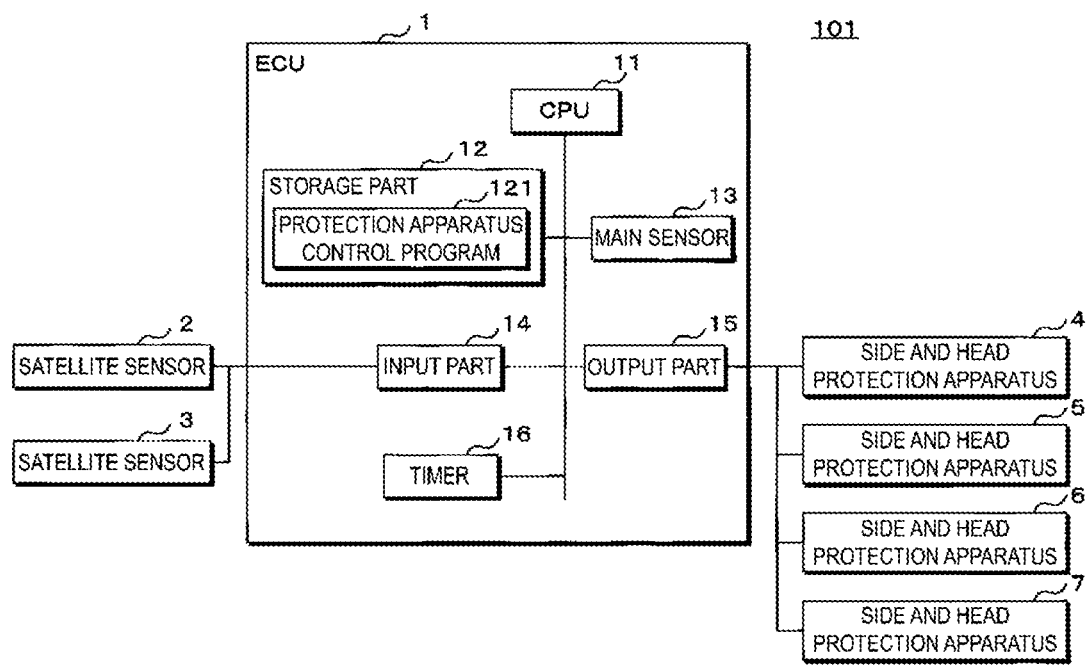
FIG. 2 is a block diagram illustrating the configuration of the control apparatus according to the embodiment.

FIG. 2 is a block diagram illustrating the configuration of the control apparatus 101.

The ECU 1 of the control apparatus 101 has a CPU 11, a storage part 12 (such as a ROM and RAM), a main sensor 13 (serving as an acceleration sensor), an input part 14, an output part 15, and a timer 16.

The main sensor 13 detects the X acceleration and the Y acceleration, and then generates an electric signal and outputs it to the CPU 11.

The satellite sensors 2, 3 are connected to the input part 14, wherein the acceleration detected by the satellite sensors 2, 3 is input at the input part 14.

The front protection apparatuses 4, 5, along with the side and head protection apparatuses 6, 7, are connected to the output part 15, wherein the activation instruction signal of the front protection apparatuses 4, 5 and the side and head protection apparatuses 6, 7 is output from the CPU 11 to the side and head protection apparatuses 6, 7.

The timer 16 is counted from the time point at which a control algorithm of the protection apparatus is started by the CPU 11.

In the storage part 12, a protection apparatus control program 121 is stored for determining whether or not a front face collision has occurred, determining whether or not an offset collision or the diagonal collision (hereinafter, referred to as an offset/diagonal collision) has occurred with an obstacle illustrated in FIG. 1, and activating the side and head protection apparatuses 6, 7 based on this determination. The protection apparatus control program 121 is recorded in a storage medium such as a CD-ROM, after which the CPU 11 reads out the protection apparatus control program 121 from the storage medium, with the protection apparatus control program 121 stored in the storage part 12. Moreover, the protection apparatus control program 121 may be acquired from an external computer (not illustrated) connected to a communication network, and then stored in the storage part 12.

If the ECU 1 is mounted on the vehicle 100 and the ignition is turned on to supply the power source to the ECU 1, the CPU 11 carries out a protection apparatus control process based on the protection apparatus control program 121 stored in the storage part 12, until the ignition is turned off.

Figure 3:
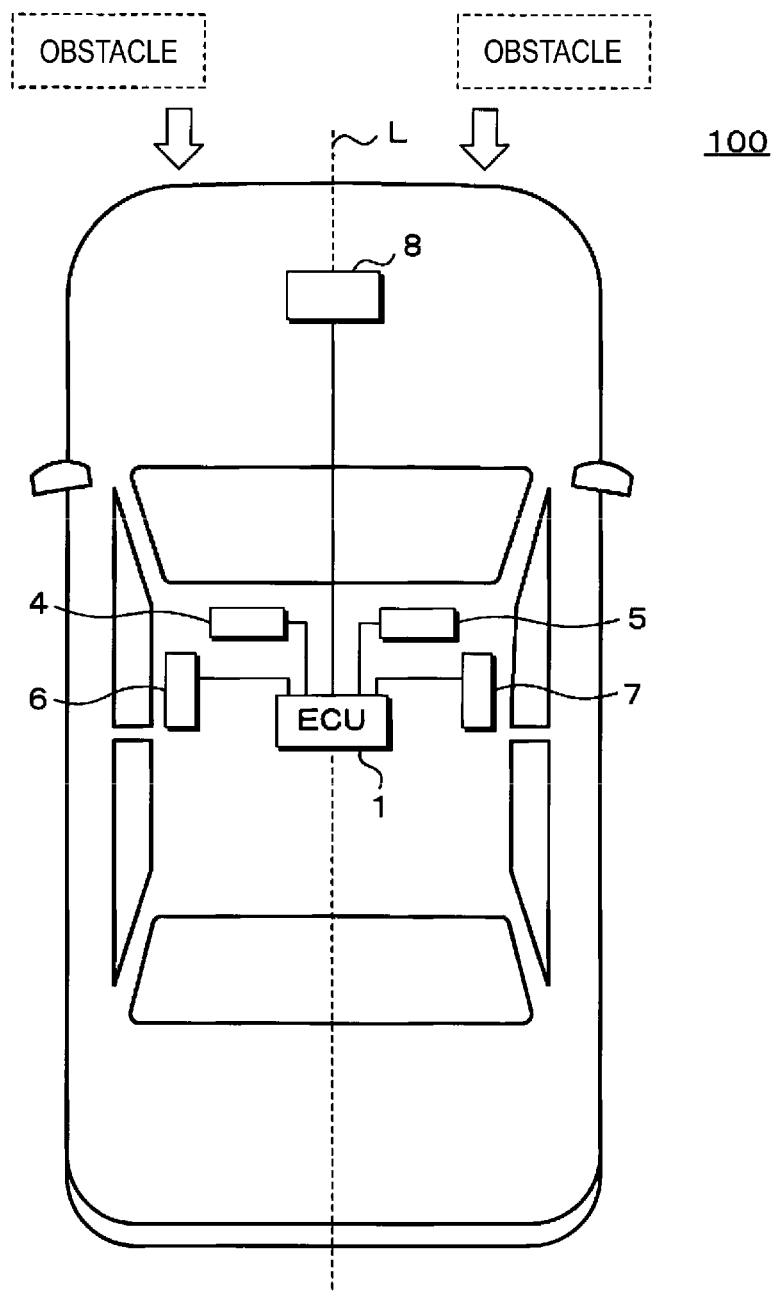
FIG. 3 is a schematic view illustrating a modified example of the vehicle.

FIG. 3 is a schematic view illustrating a modified example of the vehicle 100.

The vehicle 100 of FIG. 3 has one satellite sensor 8, unlike the vehicle 100 of FIG. 1. The satellite sensor 8 is provided on the center line L.

The protection apparatus control process using the control apparatus 101 will hereinafter be described in the event of a front face collision.

Figure 4:
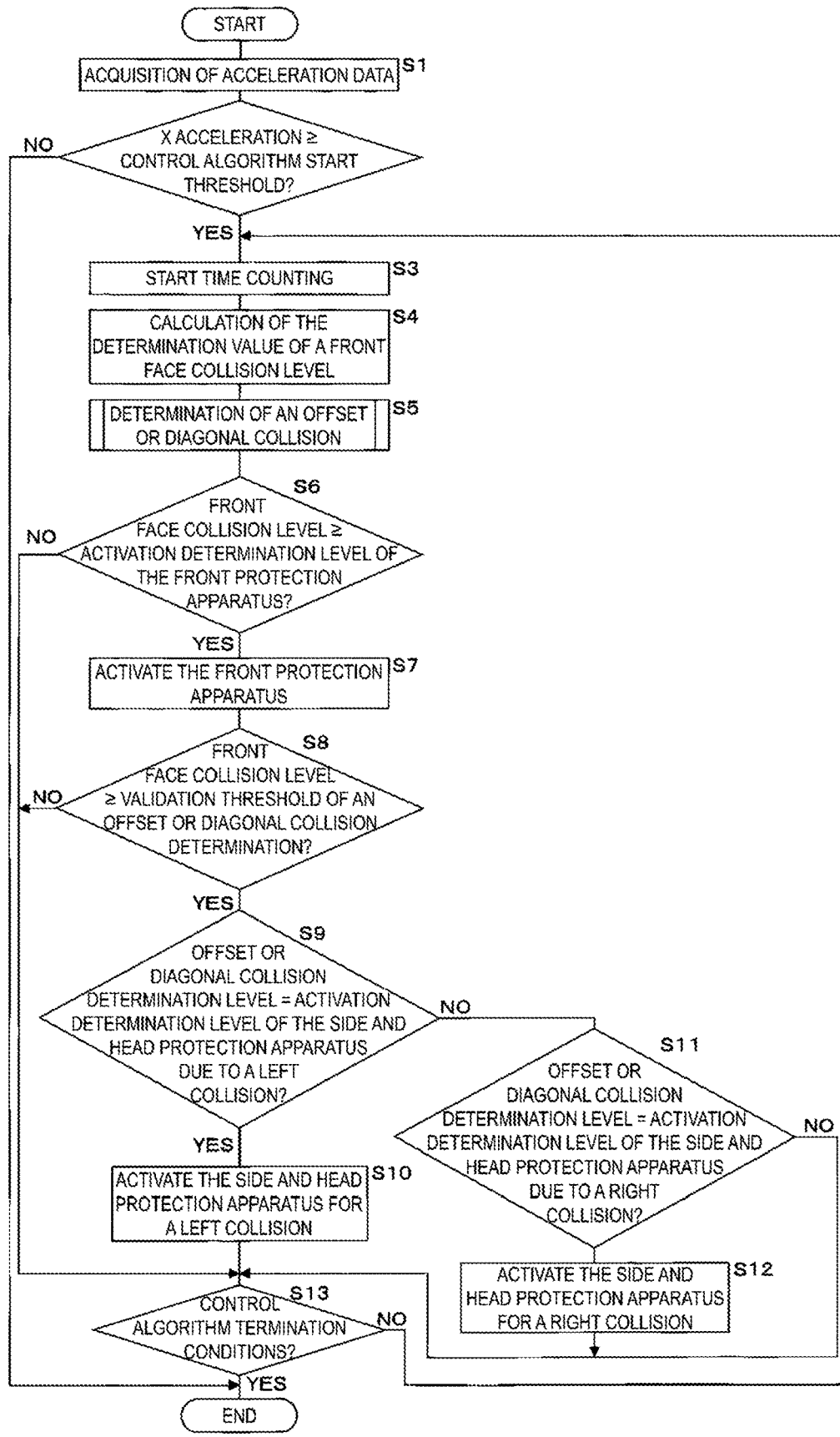
FIG. 4 is a flowchart illustrating the processing procedure of the protection apparatus control by a CPU.

FIG. 4 is a flowchart illustrating the processing procedure of the protection apparatus control by a CPU 11. The CPU 11 carries out the present process at appropriate intervals.

The CPU 11 acquires the acceleration data from the satellite sensors 2, 3 along with the main sensor 13 (S1). Here, the X acceleration and the Y acceleration are decelerations.

The CPU 11 determines whether the X acceleration (for example, the X acceleration of the main sensor 13) in the longitudinal direction of the vehicle 100 is at the control algorithm start threshold or greater (S2). The control algorithm start threshold is, for example, obtained in advance by experimentation, then stored in the storage part 12.

If the CPU 11 determines that the X acceleration is not at the control algorithm start threshold or greater (S2: NO), the process is terminated.

If the CPU 11 determines that the X acceleration is at the control algorithm start threshold or greater (S2: YES), the CPU 11 starts time counting using the timer 16 (S3), and then calculates the determination value of the front face collision level (S4). Based on, for example, the X acceleration (first acceleration) acquired by the satellite sensors 2, 3, the X acceleration (second acceleration) and the Y acceleration (third acceleration) which are acquired by the main sensor 13, $\Delta V$ (hereinafter, referred to as $\Delta V_x$) in the X direction obtained by integrating the first acceleration and the second acceleration, and $\Delta V$ (hereinafter, referred to as $\Delta V_y$) in the Y direction obtained by integrating the third acceleration, the logical product of these are found to obtain the determination value of this front face collision level. As a result, the determination value of the front face collision level can be precisely calculated.

The front face collision level of, for example, any of stages 0 to 7, is obtained using the calculated determination value.

The CPU 11 determines the below-mentioned offset/diagonal collision (S5).

The CPU 11 determines whether the obtained front face collision level is at the activation determination level or higher of the front protection apparatuses 4, 5 (S6). Once confirming that the front face collision level based on the second acceleration is the activation determination level or higher of the front protection apparatuses 4, 5, an offset/diagonal collision is determined. Therefore, with a side face collision excluded, an offset collision or diagonal collision can be favorably detected. That is, when the level is less than the activation determination level, even if the third acceleration is high, the presence of the activation of the side and head protection apparatuses 6, 7 is not determined, allowing it to be distinguished from the determination of the presence of the activation of the side and head protection apparatuses 6, 7 for side face collisions. One example of the "activation determination level of the front protection apparatuses 4, 5" is exemplified by stage "1."

If the CPU 11 determines that the front face collision level is not at the activation determination level or higher of the front protection apparatuses 4, 5 (S6: NO), the process proceeds to S13.

If the CPU 11 determines that the front face collision level is at the activation determination level or higher of the front protection apparatuses 4, 5 (S6: YES), the CPU 11 activates the front protection apparatuses 4, 5 (S7).

The CPU 11 determines whether the front face collision level is at the validation threshold or greater of the offset or diagonal collision determination (S8). As a result, side face collisions are more favorably excluded. One example of the "validation threshold of the offset/diagonal collision determination" is exemplified by stage "2."

If the CPU 11 determines that the front face collision level is not at the validation threshold or greater of the offset or diagonal collision determination (S8: NO), the process proceeds to S13.

If the CPU 11 determines that the front face collision level is at the validation threshold or greater of the offset or diagonal collision determination (S8: YES), the CPU 11 determines whether or not the offset/diagonal collision level is at the activation determination level of the side and head protection apparatus 6 due to a left collision (S9). The "activation determination level of the side and head protection apparatus 6 due to a left collision" means the case in which the below-mentioned S28 determination level is "1."

If the CPU 11 determines that the offset/diagonal collision level is at the activation determination level of the side and head protection apparatus 6 due to a left collision (S9: YES), the CPU 11 activates the side and head protection apparatus 6 (S10).

If the CPU 11 determines that the offset/diagonal collision level is not at the activation determination level of the side and head protection apparatus 6 due to a left collision (S9: NO), the CPU 11 determines whether or not the offset/diagonal collision level is at the activation determination level of the side and head protection apparatus 7 due to a right collision (S11). The "activation determination level of the side and head protection apparatus 6 due to a right collision" means the case in which the below-mentioned S28 determination level is "2."

If the CPU 11 determines that the offset/diagonal collision level is not at the activation determination level of the side and head protection apparatus 7 due to a right collision (S11: NO), that is, determines that it is a head-on collision, the process proceeds to S13.

If the CPU 11 determines that the offset/diagonal collision level is at the activation determination level of the side and head protection apparatus 7 due to a right collision (S11: YES), the CPU 11 activates the side and head protection apparatus 7 (S12), after which the process proceeds to S13.

In S13, the CPU 11 determines whether or not the conditions are the control algorithm termination conditions. Exemplary termination conditions of the control algorithm include the case in which the state (in which the X acceleration is less than the control algorithm start threshold) continues for a certain time, etc.

If the CPU 11 determines that the conditions are not the control algorithm termination conditions (S13: NO), the process returns to S3.

If the CPU 11 determines that the conditions are the control algorithm termination conditions (S13: YES), the CPU 11 terminates the control algorithm.

Figure 5:
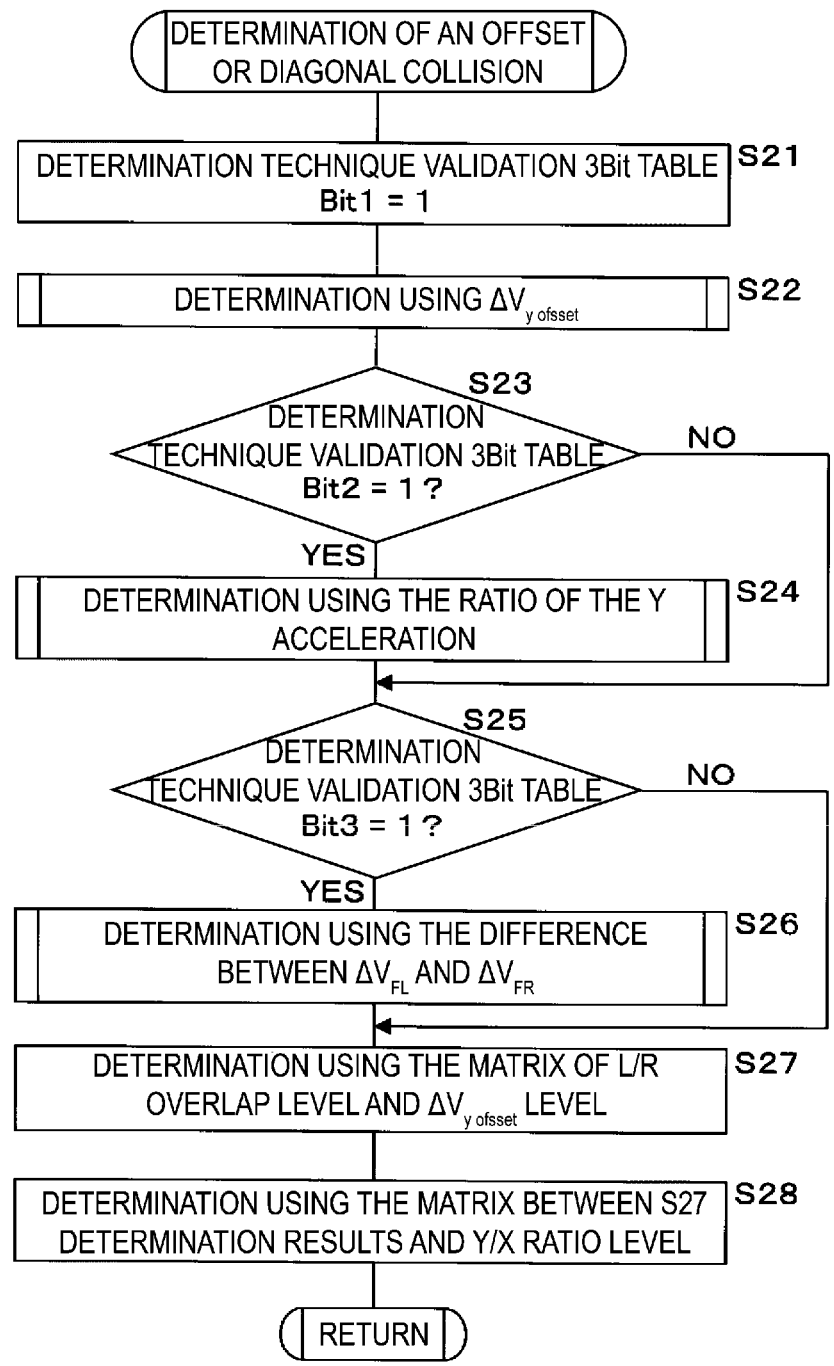
FIG. 5 is a flowchart illustrating the processing procedure of the subroutine according to the determination of an offset or diagonal collision.

FIG. 5 is a flowchart illustrating the processing procedure of the subroutine according to the determination of the abovementioned offset or diagonal collision.

The CPU 11 validates Bit1 of the determination technique validation 3 Bit table (Bit1=1) (S21).

The CPU 11 makes a determination using the below-mentioned $\Delta V_{y\ offset}$ (S22).

The CPU 11 determines whether or not Bit2 1 of the determination technique validation 3 Bit table is 1, that is, Bit2 is validated (S23). Whether or not Bit2 is validated is determined by whether the CPU 11 has accepted the instructions of a user or by the acquired acceleration data, etc.

If the CPU 11 determines that Bit2 of the determination technique validation 3 Bit table is not 1 (S23: NO), the process proceeds to S25.

If the CPU 11 determines that Bit2 of the determination technique validation 3 Bit table is 1 (S23: YES), the CPU 11 makes a determination using the ratio of the below-mentioned Y acceleration (S24).

The CPU 11 determines whether Bit3 of the determination technique validation 3 Bit table is 1 (S25).

If the CPU 11 determines that Bit3 of the determination technique validation 3 Bit table is not 1 (S25: NO), the process proceeds to S27. As with the vehicle 100 of FIG. 3, if there is only one satellite sensor, Bit3=0 and S26 is omitted.

If the CPU 11 determines that Bit3 of the determination technique validation 3 Bit table is 1 (S25: YES), the CPU 11 makes a determination using the below-mentioned difference between $\Delta V_{FL}$ and $\Delta V_{FR}$ (S26).

The CPU 11 makes a determination using the matrix between the L/R overlap level obtained using the determination of S26 and the $\Delta V_{y\ offset}$ level obtained using the determination of S22 (S27).

The CPU 11 makes a determination using the matrix between the determination results of S27 and the Y/X ratio level obtained using the determination of S24 (S28).

The CPU 11 returns the determination results of S28.

Because the determination based on $\Delta V_{offset}$ is combined with the determination based on the acceleration detected by multiple acceleration detection parts, the presence of an offset collision or diagonal collision can be precisely determined and the collision direction precisely detected.

Figure 6:
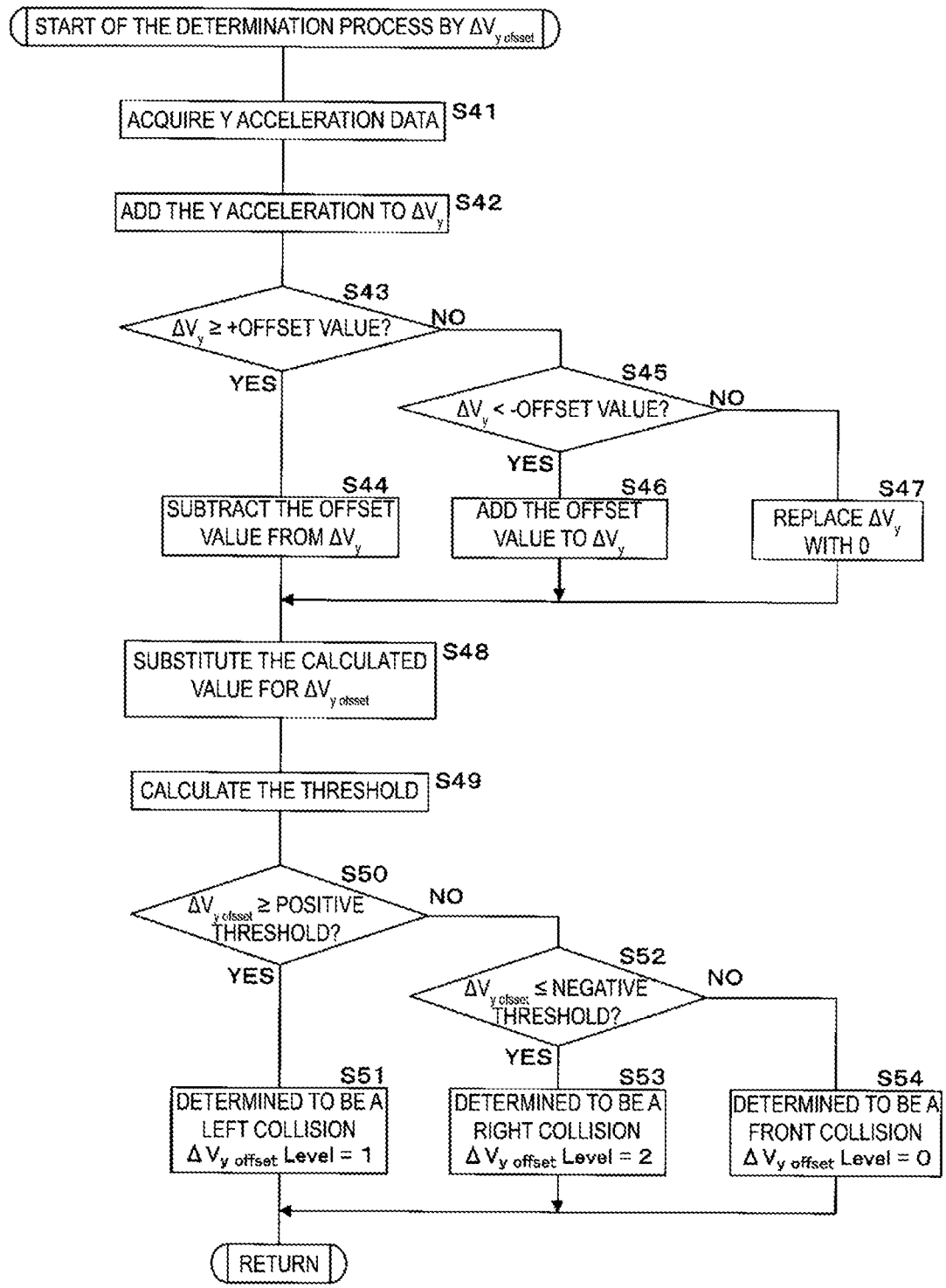
FIG. 6 is a flowchart illustrating the processing procedure of the subroutine according to the determination using ΔV$_{y\ offset}$.

FIG. 6 is a flowchart illustrating the processing procedure of the subroutine according to the abovementioned determination using $\Delta V_{y\ offset}$.

The CPU 11 acquires the Y acceleration (third acceleration) from the main sensor 13, then subjects the acquired Y acceleration data to a low pass filter process (S41). By carrying out the low pass filter process, unnecessary high frequency noise is removed, while high frequency acceleration input occurring during low speed head-on collisions and running on bad roads is removed. This low pass filter process may be implemented in terms of hardware.

The CPU 11 adds (integrates) the Y acceleration at a predetermined timing to calculate $\Delta V_y$ in the Y direction (S42).

Subsequently, the CPU 11 carries out the offset process based on the calculated $\Delta V_y$ such that $\Delta V_y$ during a front face collision converges to 0 as much as possible.

The CPU 11 determines whether $\Delta V_y$ is the +offset value or greater (S43).

If the CPU 11 determines that $\Delta V_y$ is the +offset value or greater (S43: YES), the CPU 11 subtracts the offset value from $\Delta V_y$ (S44).

If the CPU 11 determines that $\Delta V_y$ is not the +offset value or greater (S43: NO), the CPU 11 determines that $\Delta V_y$ is less than the −offset value (S45).

If the CPU 11 determines that $\Delta V_y$ is less than the −offset value (S45: YES), the CPU 11 adds the offset value to $\Delta V_y$ (S46).

If the CPU 11 determines that $\Delta V_y$ is not less than the −offset value (S45: NO), the CPU 11 replaces $\Delta V_y$ with 0 (S47).

If a high speed head-on collision occurs, the rotation due to impact after the collision may increase $\Delta V_y$. In contrast, in order to prevent $\Delta V_y$ based on the head-on collision from increasing, the Y acceleration is subjected to an offset process (bias) to attenuate $\Delta V_y$, making it possible to favorably detect an offset collision or diagonal collision. That is, because the presence of an offset collision or diagonal collision is determined based on $\Delta V_{offset}$, a head-on collision which does not require deployment of the SAB or CAB can be excluded.

The CPU 11 substitutes the calculated values of S44, 46, and 47 for $\Delta V_{y\ offset}$ (S48).

The CPU 11 calculates the threshold (S49). After the start of the control algorithm, the CPU 11 acquires time t counted by the timer 16. For example, the function of the threshold to time t is pre-stored in the storage part 12 by experimentation, wherein the CPU 11 calculates the threshold based on this function.

Moreover, the CPU 11 may set the valid period of the threshold.

If a head-on collision occurs, the rotation due to impact after the collision may increase $\Delta V_y$. In contrast, the threshold is set in accordance with the elapsed time or, alternatively, the valid period of the threshold is set, making it possible to distinguish the abovementioned case from an offset collision/diagonal collision.

Note that a certain value may be used as the threshold. However, as mentioned above, the threshold is preferably set in accordance with the elapsed time or, alternatively, the valid period of the threshold is preferably set.

The CPU 11 determines whether or not $\Delta V_{y\ offset}$ is at the positive threshold or greater (S50).

If the CPU 11 determines that $\Delta V_{y\ offset}$ is at the positive threshold or greater (S50: YES), the CPU 11 determines that it is a left collision, with a $\Delta V_{y\ offset}$ level of "1" (S51), after which the process returns.

If the CPU 11 determines that $\Delta V_{y\ offset}$ is not the positive threshold or greater (S50: NO), the CPU 11 determines whether $\Delta V_{y\ offset}$ is at the negative threshold or less (S52).

If the CPU 11 determines that $\Delta V_{y\ offset}$ is at the negative threshold or less (S52: YES), the CPU 11 determines that it is a right collision, with a $\Delta V_{y\ offset}$ level of "2" (S53), after which the process returns.

If the CPU 11 determines that $\Delta V_{y\ offset}$ is not at the negative threshold or less (S52: NO), the CPU 11 determines that it is a head-on collision, with a $\Delta V_{y\ offset}$ Level of "0" (S54), after which the process returns.

Figure 7:
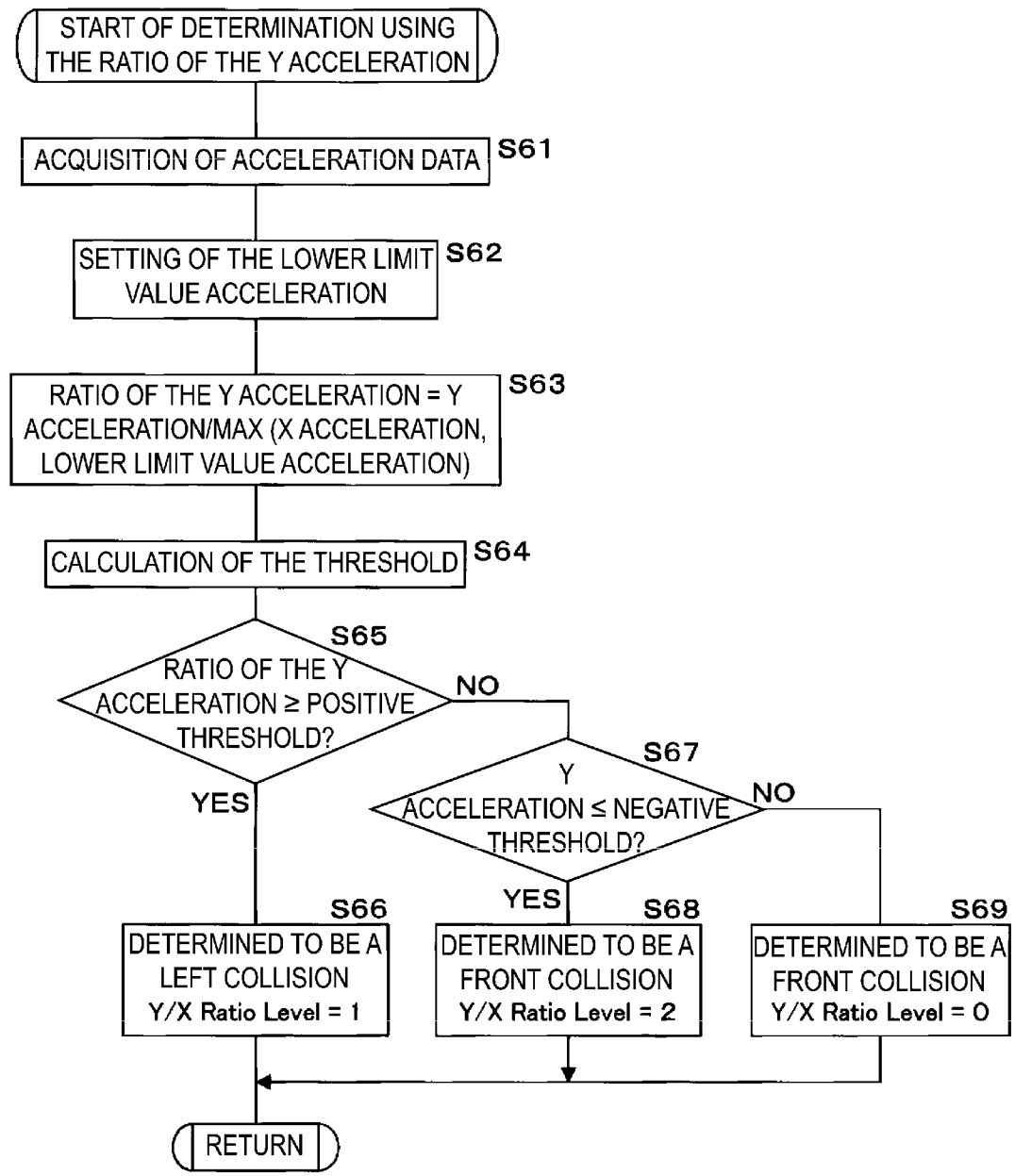
FIG. 7 is a flowchart illustrating the processing procedure of the subroutine according to the determination based on the ratio of the Y acceleration.

FIG. 7 is a flowchart illustrating the processing procedure of the subroutine according to the determination based on the abovementioned ratio of the Y acceleration.

The CPU 11 acquires the X acceleration and the Y acceleration from the main sensor 13 (S61). The acquired acceleration data may be subjected to the low pass filter process.

The CPU 11 sets the lower limit value acceleration (S62). In order to obtain the ratio of the Y acceleration to the X acceleration, if the X acceleration is 0, the ratio cannot be calculated. With that, if the X acceleration is 0, the lower limit value acceleration as a denominator is obtained.

The CPU 11 calculates the ratio of the Y acceleration using the following formula (S63).

The ratio of the Y acceleration=Y acceleration/MAX (X acceleration, lower limit value acceleration)

That is, the Y acceleration is divided by the larger value of the X acceleration and the lower limit value acceleration.

The CPU 11 calculates the threshold (S64). After the start of the control algorithm, the CPU 11 acquires time t counted by the timer 16. For example, the function of the threshold to time t is pre-stored in the storage part 12, wherein the CPU 11 calculates the threshold based on this function.

Moreover, the CPU 11 may set the valid period of the threshold.

Note that a certain value may be used as the threshold. However, as mentioned above, the threshold is preferably set in accordance with the elapsed time or, alternatively, the valid period of the threshold is preferably set.

The CPU 11 determines whether or not the ratio of the calculated Y acceleration is at the positive threshold or greater (S65).

If the CPU 11 determines that the ratio of the Y acceleration is at the positive threshold or greater (S65: YES), the CPU 11 determines that it is a left collision, with a Y/X ratio level of "1" (S66), after which the process returns.

If the CPU 11 determines that the ratio of the Y acceleration is not at the positive threshold or greater (S65: NO), the CPU 11 determines that the ratio of the Y acceleration is at the negative threshold or less (S67).

If the CPU 11 determines that the ratio of the Y acceleration is at the negative threshold or less (S67: YES), the CPU 11 determines that it is a right collision, with a Y/X ratio level of "2" (S68), after which the process returns.

If the CPU 11 determines that the ratio of the Y acceleration is not at the negative threshold or less (S67: NO), the CPU 11 determines that it is a head-on collision, with a Y/X ratio level of "0" (S69), after which the process returns.

If the X acceleration increases in the case of a head-on collision, the ratio of the Y acceleration decreases, while in the case of an offset/diagonal collision, the ratio of the Y acceleration increases compared with the ratio during a head-on collision, thereby determining the collision form. If the ratio of the Y acceleration is a positive value or negative value, a determination is made regarding whether or not it has exceeded either a positive threshold or a negative threshold, making it possible to detect the collision direction.

Figure 8:
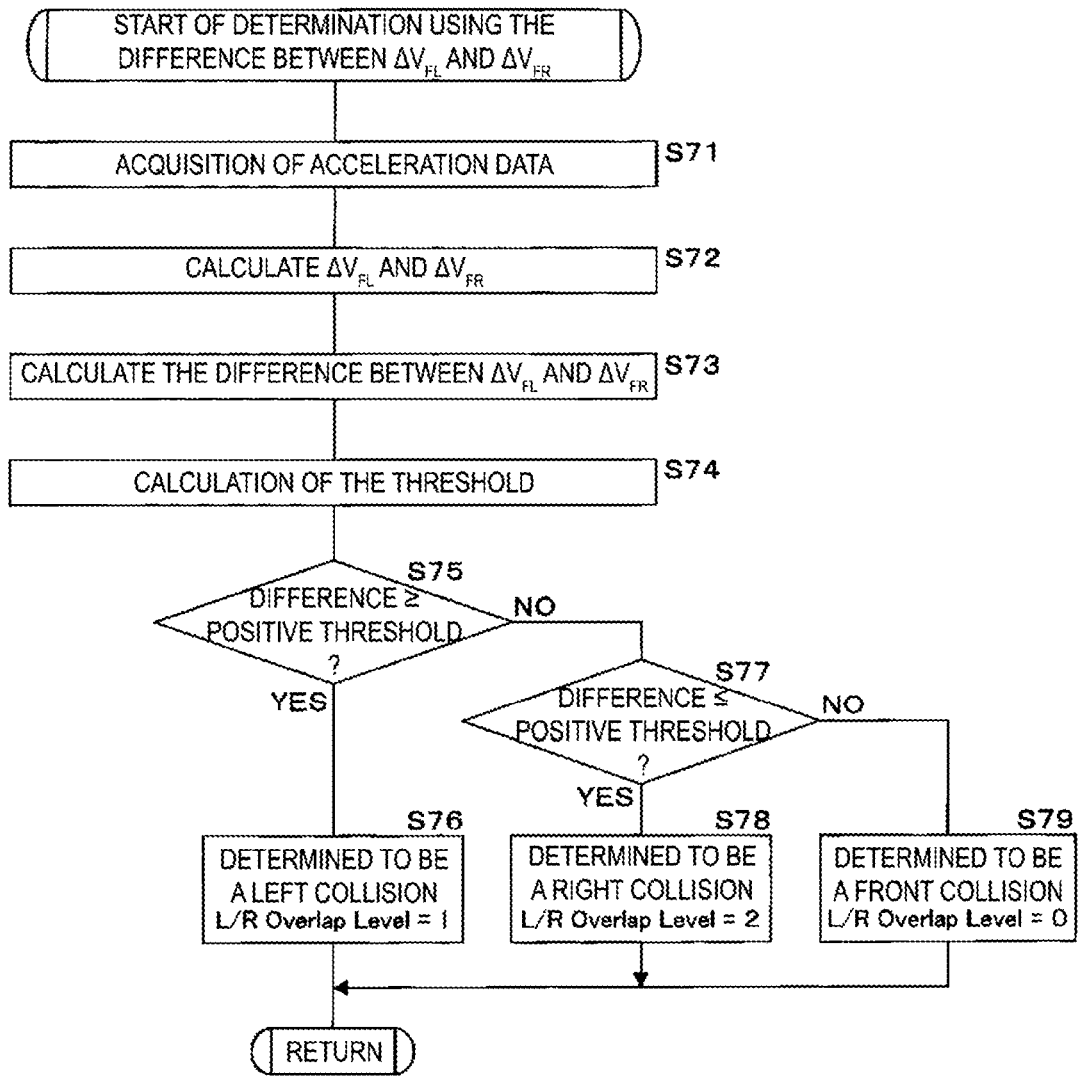
FIG. 8 is a flowchart illustrating the processing procedure of the subroutine according to the determination using the difference between ΔV$_{FL}$ and ΔV$_{FR}$.

FIG. 8 is a flowchart illustrating the processing procedure of the subroutine according to the determination using the abovementioned difference between $\Delta V_{FL}$ and $\Delta V_{FR}$.

When the CPU 11 has the satellite sensors 2, 3 as in the vehicle 100 of FIG. 1, the CPU 11 acquires the X acceleration of the left satellite sensor 2, along with the X acceleration of the right satellite sensor 3 (S71). The acquired acceleration data may be subjected to the low pass filter process.

The CPU 11 calculates $\Delta V_{FL}$ based on the X acceleration of the satellite sensor 2, then calculates $\Delta V_{FR}$ based on the X acceleration of the satellite sensor 3 (S72).

The CPU 11 calculates the difference between $\Delta V_{FL}$ and $\Delta V_{FR}$ (S73).

The CPU 11 calculates the threshold (S74). After the start of the control algorithm, the CPU 11 acquires time t counted by the timer 16. For example, the function of the threshold to time t is pre-stored in the storage part 12, wherein the CPU 11 calculates the threshold based on this function.

Moreover, the CPU 11 may set the valid period of the threshold.

Note that a certain value may be used as the threshold. However, as mentioned above, the threshold is preferably set in accordance with the elapsed time or, alternatively, the valid period of the threshold is preferably set.

The CPU 11 determines whether or not the calculated difference is at the positive threshold or greater (S75).

If the CPU 11 determines that the difference is at the positive threshold or greater (S75: YES), the CPU 11 determines that it is a left collision, with an L/R overlap level of "1" (S76), after which the process returns.

If the CPU 11 determines that the difference is not at the positive threshold or greater (S75: NO), the CPU 11 determines whether the difference is the negative threshold or less (S77).

If the CPU 11 determines that the difference is at the negative threshold or less (S77: YES), the CPU 11 determines that it is a right collision, with an L/R overlap level of "2" (S78), after which the process returns.

If the CPU 11 determines that the difference is not at the negative threshold or less (S77: NO), the CPU 11 determines that it is a head-on collision, with an L/R overlap level of "0" (S79), after which the process returns.

In the case of a head-on collision, because a collision object collides head on in the width direction at the front of the vehicle, the difference between $\Delta V_{FL}$ and $\Delta V_{FR}$ of the satellite sensors 2, 3 on both sides thereof is small. In contrast, in the case of an offset/diagonal collision, when the difference increases, the collision form is determined, wherein, if the difference is either a positive value or a negative value, the collision direction can be detected.

FIG. 9 is a view illustrating a matrix for the abovementioned determination of S27. In this matrix, items in the row direction are in the $\Delta V_{yoffset}$ level based on S22, while items in the column direction are in the L/R overlap level based on S26. If a determination logic is not used, the numerical value is defined as level "0."

The CPU 11 makes a determination based on this matrix.

FIG. 10 is a view illustrating a matrix for the abovementioned determination of S28. In this matrix, items in the row direction are the determination results of S27, while items in the column direction are in the L/R overlap level based on S24.

The CPU 11 makes a determination based on this matrix.

Note that the combination of the determination is not limited to the abovementioned case. Moreover, risks such as a failure of the main sensor 13 embedded in the ECU 1 are lower than the satellite sensors 2, 3, detected data thereof is more assured, and the behavior of the vehicle can be more favorably determined. Therefore, the L/R overlap level may not be obtained.

As described above, in the present embodiment, once confirming that the level is at the activation determination level of the front protection apparatuses 4, 5 for a front face collision based on the second acceleration, etc., an offset/diagonal collision is determined. Therefore, with a side face collision excluded, an offset collision or diagonal collision can be favorably detected.

In addition, as mentioned above, because the presence of an offset/diagonal collision is determined based on $\Delta V_{yoffset}$, a head-on collision can be excluded.

When the level of a front face collision and $\Delta V_{yoffset}$ are compared with the threshold to be determined, the more suitable apparatus of the side and head protection apparatuses 6, 7 can be activated at a timing in accordance with the degree of collision.

In addition, in the present embodiment, in the case of having only the satellite sensor 8, an offset/diagonal collision can be favorably detected, while the more suitable apparatus of the side and head protection apparatuses 6, 7 can be activated at a favorable timing based on the degree of the offset/diagonal collision.

EXAMPLES

The activation control of the protection apparatus upon performing a collision test using a vehicle 100 according to an embodiment will hereinafter be described.

Figure 11:
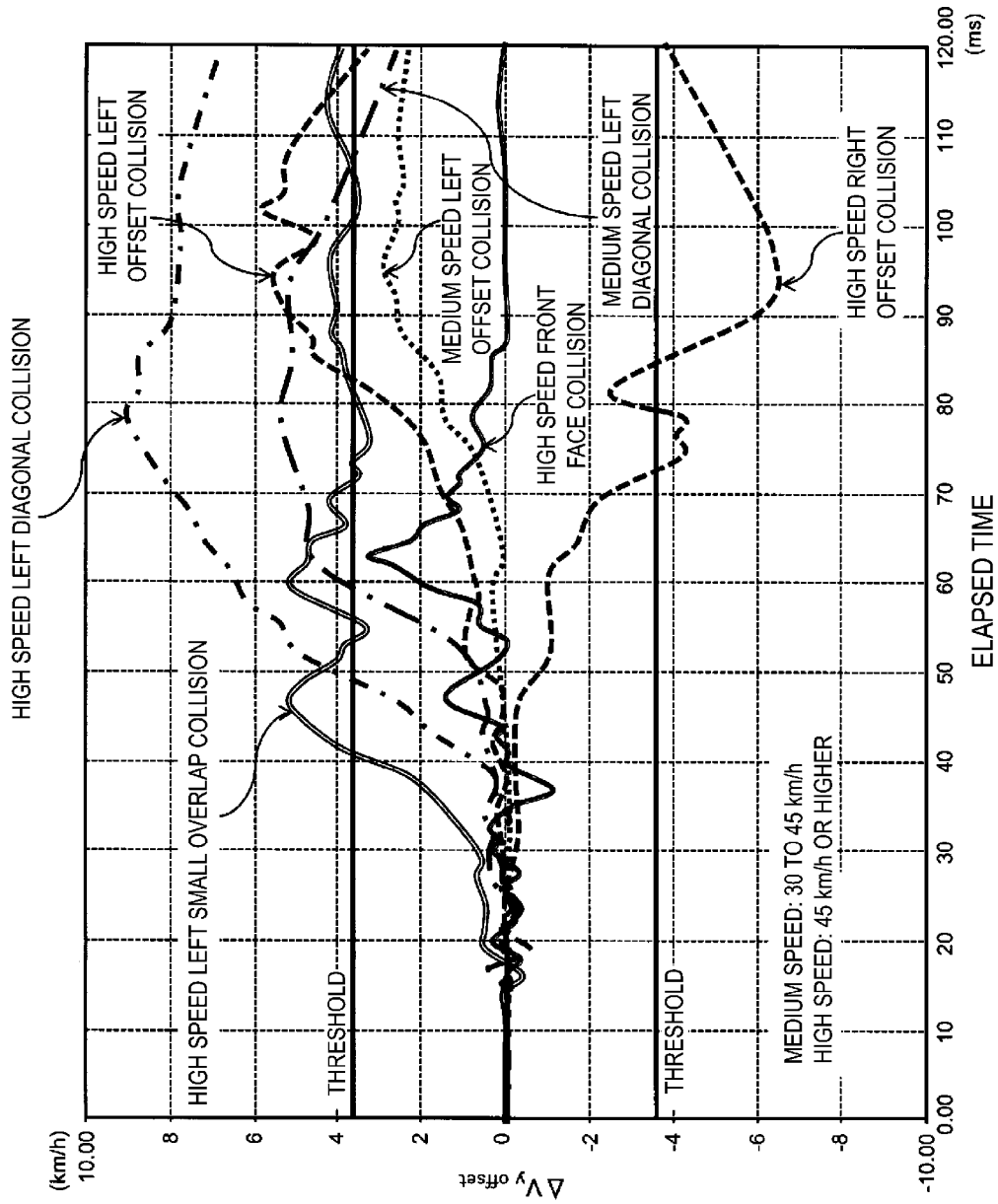
FIG. 11 is a graph illustrating the relationship between the elapsed time from the start of a collision and ΔV$_{y\ offset}$ when testing each of a high speed front face collision, a medium speed left offset collision, a high speed left offset collision, a high speed right offset collision, a high speed left small overlap collision, a medium speed left diagonal collision, and a high speed left diagonal collision.

FIG. 11 is a graph illustrating the relationship between the elapsed time and $\Delta V_{y\,offset}$ when testing each of a high speed front face collision, a medium speed left offset collision, a high speed left offset collision, a high speed right offset collision, a high speed left small overlap collision, a medium speed left diagonal collision, and a high speed left diagonal collision. The transverse axis is the elapsed time (mS), while the vertical axis is $\Delta V_{yoffset}$ (km/h). Among the offset collisions, a small overlap collision is a collision in which a quarter of the driver seat side of a front part hits an obstacle such as another vehicle.

In FIG. 11, by subjecting the Y acceleration to the low pass filter process, acceleration input having a frequency of 75 Hz is removed. The offset acceleration is set to 0.9216 G, while the threshold is set to 3.6 km/h.

Because the threshold is set to 3.6 km/h, high speed head-on collisions are excluded. In the case of a medium speed left offset collision, if $\Delta V_y$ is less than the threshold, the degree of collision is small. Therefore, it is not determined to be an offset/diagonal collision and the side and head protection apparatus 6 is not activated. In the case of a high speed left offset collision, a high speed small overlap collision, a medium speed left diagonal collision, and a high speed left diagonal collision, it is determined to be an offset/diagonal collision at a timing at which $\Delta V_y$ has exceeded the threshold, with the side and head protection apparatus 6 activated. In the case of a high speed right offset collision, it is determined to be an offset/diagonal collision at a timing in which $\Delta V_y$ has exceeded the threshold, with the side and head protection apparatus 7 activated.

Figure 12:
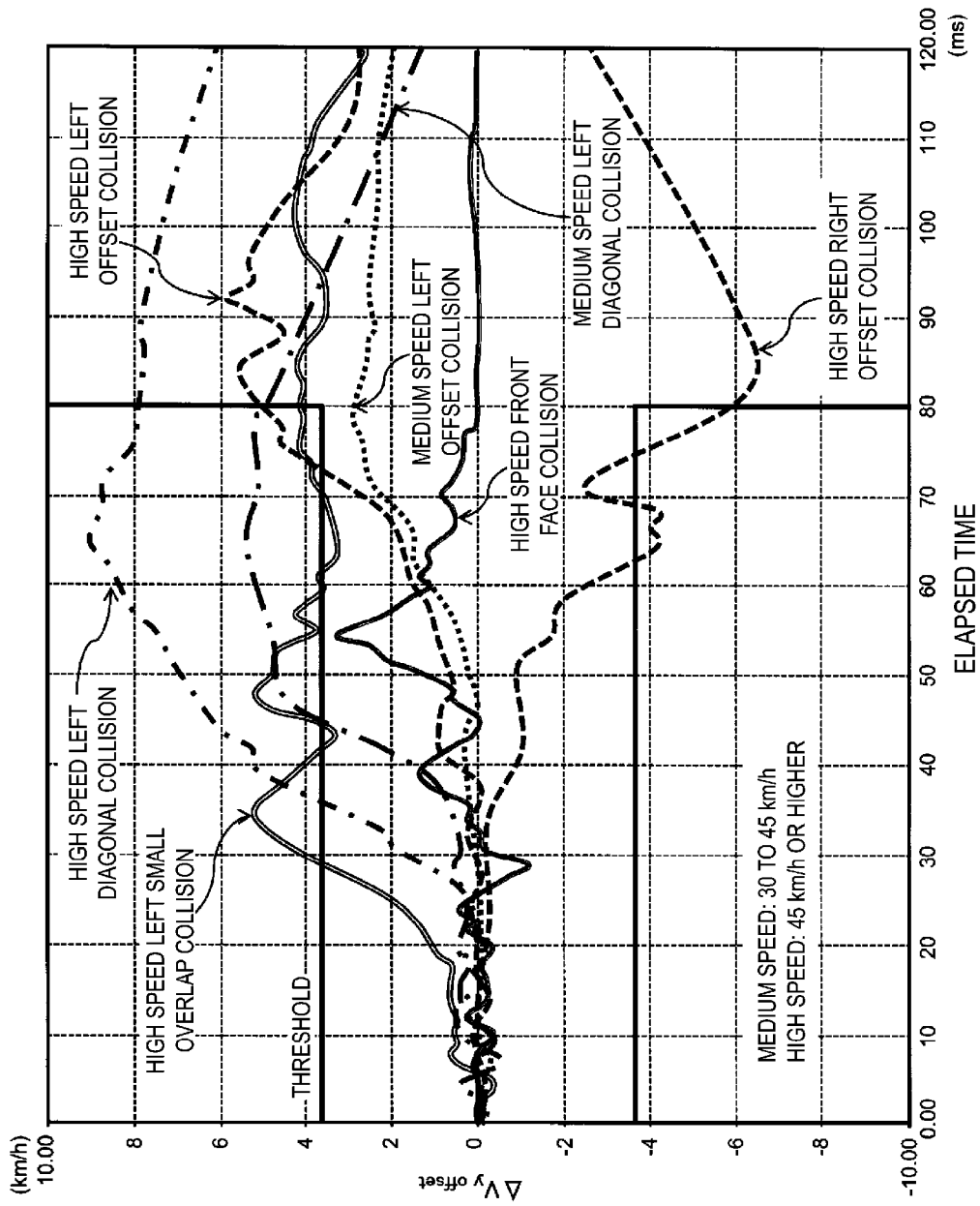
FIG. 12 is a graph illustrating the relationship between the elapsed time from the start of a collision and ΔV$_{y\ offset}$ when testing each of a high speed front face collision, a medium speed left offset collision, a high speed left offset collision, a high speed right offset collision, a high speed left small overlap collision, a medium speed left diagonal collision, and a high speed left diagonal collision.

FIG. 12 is a graph illustrating the relationship between the elapsed time and $\Delta V_{y\,offset}$ when testing each of a high speed front face collision, a medium speed left offset collision, a high speed left offset collision, a high speed right offset collision, a high speed left small overlap collision, a medium speed left diagonal collision, and a high speed left diagonal collision. The transverse axis is the elapsed time (mS), while the vertical axis is $\Delta V_{yoffset}$ (km/h).

In FIG. 11, the threshold is constant, while in FIG. 12, the threshold is invalidated after 80 mS from the start of the control algorithm, that is, the valid period of the threshold is provided. Therefore, after a head-on collision, the vehicle strays sharply sideways. Therefore, the case in which $\Delta V_y$ increases after a predetermined time has elapsed can be excluded, preventing the collision from being unexpectedly determined to be an offset/diagonal collision and from activating the side and head protection apparatuses 6, 7. Moreover, in the case of a medium speed left offset collision, if $\Delta V_y$ is less than the threshold, the degree of collision is small. Therefore, it is not determined to be an offset/diagonal collision and the side and head protection apparatus 6 is not activated.

Figure 13:
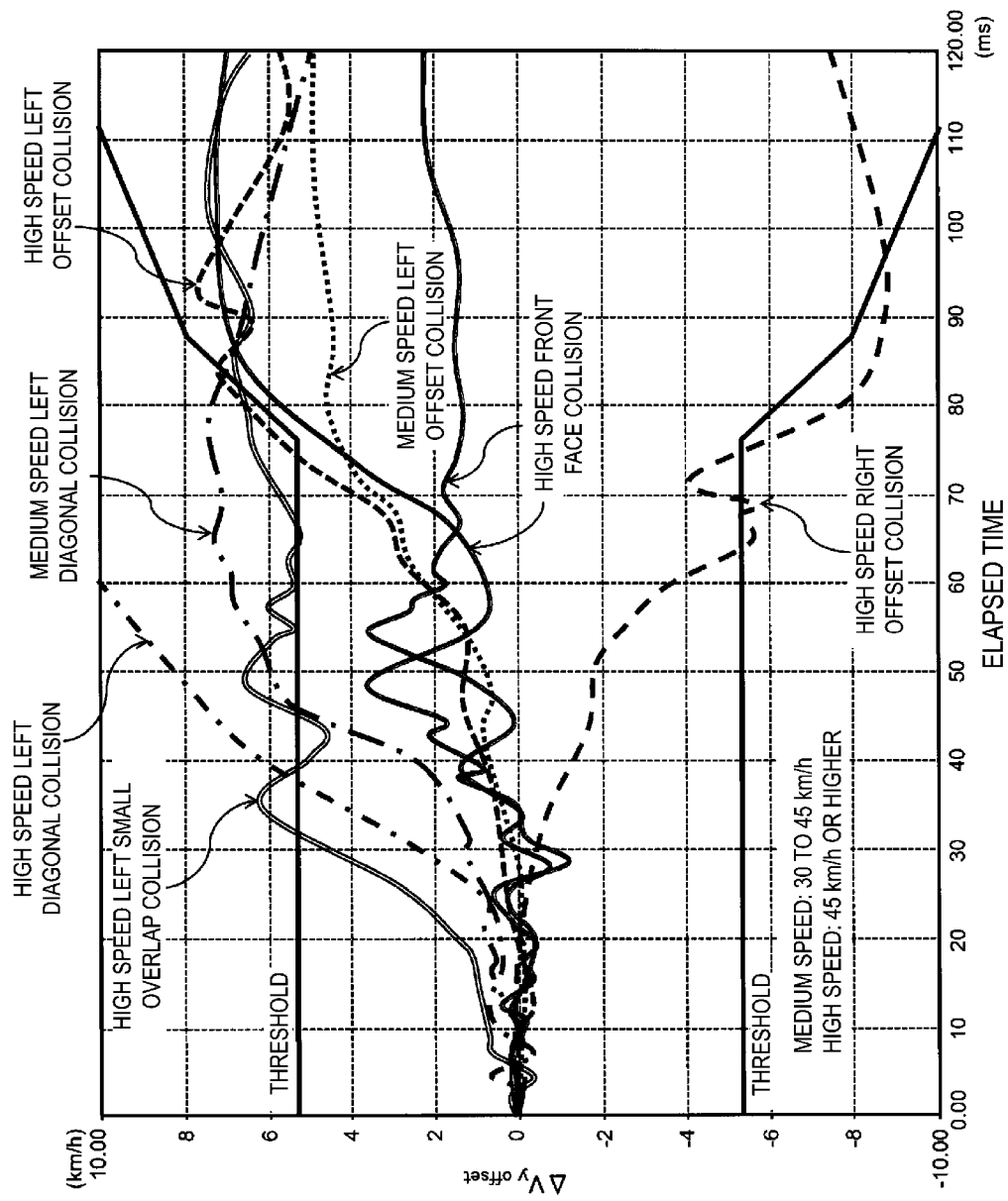
FIG. 13 is a graph illustrating the relationship between the elapsed time from the start of a collision and ΔV$_{y\ offset}$ when testing each of a high speed front face collision, a medium speed left offset collision, a high speed left offset collision, a high speed right offset collision, a high speed left small overlap collision, a medium speed left diagonal collision, and a high speed left diagonal collision.

FIG. 13 is a graph illustrating the relationship between the elapsed time and $\Delta V_{y\,offset}$ when testing each of a high speed front face collision, a medium speed left offset collision, a high speed left offset collision, a high speed right offset collision, a high speed left small overlap collision, a medium speed left diagonal collision, and a high speed left diagonal collision. The transverse axis is the elapsed time (mS), while the vertical axis is $\Delta V_{yoffset}$ (km/h).

In FIG. 13, the threshold is set so as to change in accordance with the elapsed time.

In FIG. 13, $\Delta V_{yoffset}$ rises to 7 km/h. This is because the vehicle rotates due to impact after this collision. In this case, if the threshold is changed over time, if the abovementioned causes make $\Delta V_{yoffset}$ rise, the activation of the side and head protection apparatuses 6, 7 can be prevented, making it possible to favorably determine the activation of the side and head protection apparatuses 6, 7. Moreover, in the case of a medium speed left offset collision, if $\Delta V_y$ is less than the threshold, the acceleration is input but the degree of collision is small. Therefore, it is not determined to be an offset/diagonal collision and the side and head protection apparatus 6 is not activated.

Figure 14:
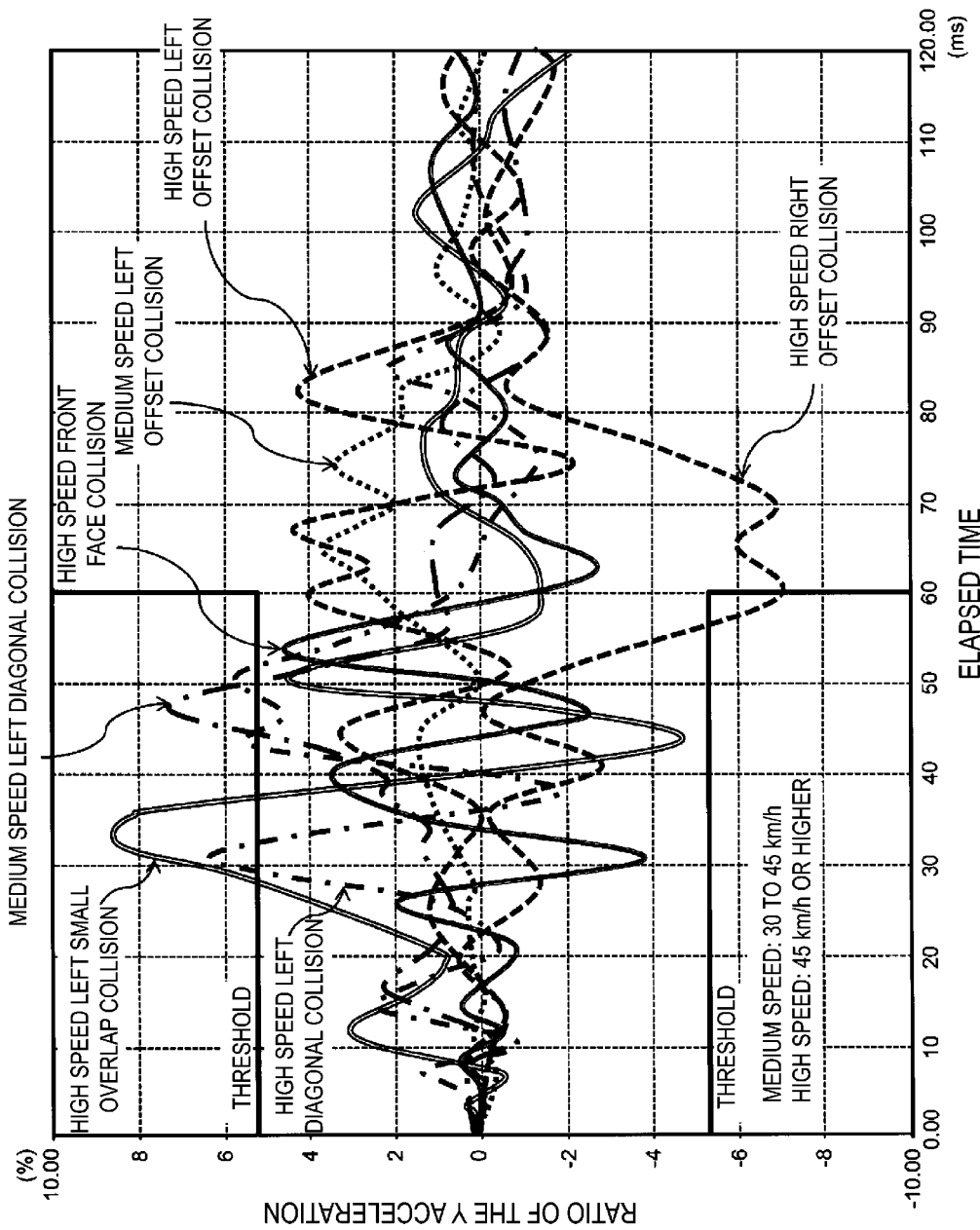
FIG. 14 is a graph illustrating the relationship between the elapsed time from the start of a collision and the ratio of the Y acceleration to X acceleration when testing each of a high speed front face collision, a medium speed left offset collision, a high speed left offset collision, a high speed right offset collision, a high speed left small overlap collision, a medium speed left diagonal collision, and a high speed left diagonal collision.

FIG. 14 is a graph illustrating the relationship between the elapsed time and the ratio of the Y acceleration to X acceleration when testing each of a high speed front face collision, a medium speed left offset collision, a high speed left offset collision, a high speed right offset collision, a high speed left small overlap collision, a medium speed left diagonal collision, and a high speed left diagonal collision. The transverse axis is the elapsed time (mS), while the vertical axis is the ratio (%) of the Y acceleration.

In the case of a high speed small overlap collision, a medium speed left diagonal collision, and a high speed left diagonal collision, it is determined to be an offset/diagonal collision at a timing in which the ratio of the Y acceleration has exceeded the threshold, with the side and head protection apparatus 6 activated. In the case of a high speed right offset collision, it is determined to be an offset/diagonal collision at a timing in which the ratio of the Y acceleration has exceeded the threshold, with the side and head protection apparatus 7 activated. In the case of a high speed left offset collision, if the ratio of the Y acceleration does not exceed the threshold, it is determined to be an offset/diagonal collision and therefore must be combined with other steps of the abovementioned protection apparatus control process to determine an offset/diagonal collision.

Figure 15:
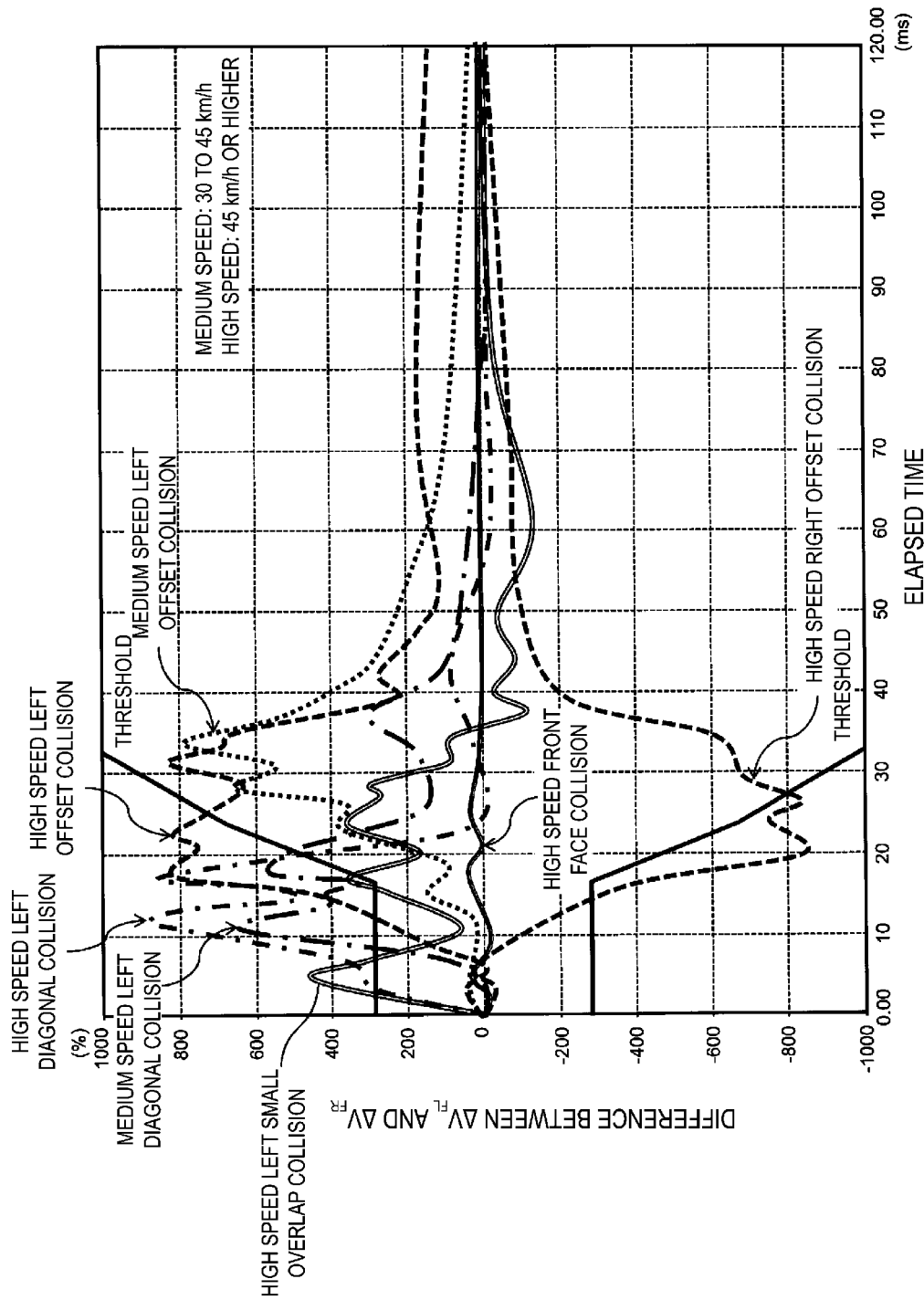
FIG. 15 is a graph illustrating the relationship between the elapsed time from the start of a collision and the difference between ΔV$_{FL}$ and ΔV$_{FR}$ when testing each of a high speed front face collision, a medium speed left offset collision, a high speed left offset collision, a high speed right offset collision, a high speed left small overlap collision, a medium speed left diagonal collision, and a high speed left diagonal collision.

FIG. 15 is a graph illustrating the relationship between the elapsed time and the difference between $\Delta V_{FL}$ and $\Delta V_{FR}$ when testing each of a high speed front face collision, a medium speed left offset collision, a high speed left offset collision, a high speed right offset collision, a high speed left small overlap collision, a medium speed left diagonal collision, and a high speed left diagonal collision. The transverse axis is the elapsed time (mS), while the vertical axis is the difference (%) between $\Delta V_{FL}$ and $\Delta V_{FR}$.

In the case of a high speed left offset collision, a high speed right offset collision, a high speed small overlap collision, a medium speed left diagonal collision, and a high speed left diagonal collision, it is determined to be an offset/diagonal collision and the side and head protection apparatus 6 or 7 are activated, while, if the satellite sensor breaks down, it cannot be determined.

The present embodiment is necessarily combined with the determination made after obtaining $\Delta V_{yoffset}$, which does not cause the abovementioned problems.

As described above, in the present embodiment, with a side face collision and head-on collision excluded, an offset/diagonal collision is favorably detected, after which it is confirmed that the more suitable side and head protection apparatus can be activated at a suitable timing based on the degree of the offset/diagonal collision.

Embodiments disclosed herein should be regarded as illustrative in all respects and not restrictive. The scope of the present invention is indicated not by the abovementioned meaning but by the patent claims and is intended to include all changes in the meaning and scope equivalent to the patent claims. That is, embodiments obtained by combining the technical means which are appropriately changed within the scope indicated in the claims are included within the technical scope of the present invention.

For example, the main sensor 13 is not limited to the case in which the main sensor 13 is embedded in the ECU 1.

Moreover, the order of the steps of a flowchart illustrating the processing procedure of the protection apparatus control process by the CPU 11 is not limited to the order illustrated in FIG. 4. The determination process of the offset/diagonal collision of S5 may be carried out concurrently with the determination process in which the front face collision level of S6 is the activation determination level or higher of the front protection apparatuses 4, 5. Moreover, if it is determined that a front face collision level is at the activation determination level or higher of the front protection apparatuses 4, 5 by S6, the determination process of the offset/diagonal collision may be carried out.

EXPLANATION OF THE SYMBOLS

1 ECU
11 CPU
12 Storage part
13 Main sensor
14 Input part
15 Output part
16 Timer
2, 3 Satellite sensor
4, 5 Front protection apparatus
6, 7 Side and head protection apparatus
100 Vehicle
101 Control apparatus

What is claimed is:

1. A control apparatus of a passenger protection apparatus, comprising:
    a first acceleration detection part for location at a front of a vehicle to detect a first acceleration in a longitudinal direction of the vehicle;
    a second acceleration detection part for location at a center of the vehicle to detect a second acceleration in the longitudinal direction of the vehicle and a third acceleration in a width direction of the vehicle; and
    a control part for determining a front face collision based on the first and second accelerations detected by the first acceleration detection part and the second acceleration detection part, respectively to activate the passenger protection apparatus,
    wherein the control part comprises:
        a speed calculation part for integrating the first and second accelerations to obtain a speed ($\Delta V$);
        a level calculation part for calculating a level of a front face collision based on the first acceleration and the second acceleration;
        a $\Delta V_{offset}$ calculation part for making an offset adjustment of $\Delta V$ obtained by integrating the third acceleration so as to attenuate $\Delta V$ of the third acceleration based on a head-on collision, in order to obtain $\Delta V_{offset}$; and
        a first determination part for determining a presence of an offset collision or diagonal collision based on the level of the front face collision and the $\Delta V_{offset}$;
    wherein the control part activates the passenger protection apparatus for protecting a side and head of a passenger including a side airbag and a curtain airbag, if it is determined using the first determination part that an offset collision or diagonal collision has occurred.

2. The control apparatus according to claim 1, wherein the control part compares the $\Delta V_{offset}$ with a threshold to determine the presence and direction of an offset collision or diagonal collision.

3. The control apparatus according to claim 2, wherein the control part comprises either:
    a threshold setting part for counting an elapsed time from a time point at which it is determined that the second acceleration is equal to or greater than a start threshold to set the threshold for determining the presence of an offset collision or diagonal collision using the first determination part or the second determination part in accordance with the elapsed time; or
    a valid period setting part for setting a valid period of the threshold in accordance with the elapsed time.

4. The control apparatus according to claim 1, wherein the control part comprises:
    a first determination technique for determining the presence and direction of an offset collision or diagonal collision based on a ratio of the third acceleration to the second acceleration; and
    second determination part for determining the presence of an offset collision or diagonal collision, using at least one second determination technique for determining the presence and direction of an offset collision or diagonal collision, based on a difference of ΔV based on the first acceleration detected by each first acceleration detection part, upon comprising the first acceleration detection part on both sides in the width direction at the front of the vehicle.

5. The control apparatus according to claim 1, wherein the control part comprises a processing part for subjecting at least one of the first acceleration, the second acceleration, and the third acceleration to a low pass filter process.

6. The control apparatus according to claim 1, wherein, based on the first acceleration, the second acceleration, the third acceleration, and ΔV obtained by integrating these accelerations, the level calculation part obtains a logical product of these to obtain the level of a front face collision.

7. A method for controlling a protection apparatus, comprising:
  determining a level of a front face collision based on a first acceleration in a longitudinal direction of a vehicle detected by a first acceleration detection part disposed at the front of the vehicle, and a second acceleration in the longitudinal direction detected by a second acceleration detection part disposed at a center of the vehicle;
  making an offset adjustment to a speed (ΔV) obtained by integrating a third acceleration in the width direction of the vehicle detected by the second acceleration detection part so as to attenuate ΔV of the third acceleration based on a head-on collision, in order to obtain $\Delta V_{offset}$;
  determining a presence of an offset collision or diagonal collision based on the level of the front face collision, and the $\Delta V_{offset}$; and
  activating the passenger protection apparatus for protecting the side and head of a passenger including a side airbag and a curtain airbag, if it is determined that an offset collision or diagonal collision has occurred.

* * * * *